United States Patent [19]

Shintani et al.

[11] 4,307,223

[45] Dec. 22, 1981

[54] SOLID RESIN PREPARED BY POLYMERIZING BY-PRODUCT TAR FORMED DURING PREPARATION OF RESORCINOL

[75] Inventors: Akira Shintani, Toyonaka; Katsuo Akagane, Ashiya; Yasuhisa Saito, Toyonaka, all of Japan; Takashi Urata, deceased, late of Higashiosaka, Japan, by Takako Urata, executrix

[73] Assignee: Sumitomo Chemical Company, Limited, Osaka, Japan

[21] Appl. No.: 45,624

[22] Filed: Jun. 5, 1979

[30] Foreign Application Priority Data

Jun. 7, 1978 [JP] Japan ................................. 53-69280

[51] Int. Cl.$^3$ ...................... C08G 65/38; C08G 65/40
[52] U.S. Cl. ...................................... 528/212; 260/38; 428/454; 428/457; 428/460; 525/480; 525/523; 525/534; 525/403; 525/452; 528/86; 528/125; 528/126; 528/205; 528/218; 528/219

[58] Field of Search ................ 528/86, 205, 125, 126, 528/219, 212, 218

[56] References Cited

U.S. PATENT DOCUMENTS 4,018,739  4/1977  Okamoto et al. .................. 528/155

*Primary Examiner*—Howard E. Schain
*Attorney, Agent, or Firm*—Stevens, Davis, Miller & Mosher

[57] ABSTRACT

A solid resinous product useful for coatings, adhesives and molding materials which is obtained by polymerizing a by-product tar produced as by-product in manufacturing resorcinol or resorcinol and hydroquinone via hydroperoxide of m-diisopropylbenzene or of a combination of m- and p-diisorpopylbenzenes and containing m-substituted phenolic constituents or a combination of m- and p-substituted phenolic constituents as major constituents.

3 Claims, No Drawings

SOLID RESIN PREPARED BY POLYMERIZING BY-PRODUCT TAR FORMED DURING PREPARATION OF RESORCINOL

This invention relates to a useful solid resinous product and uses thereof, said product being obtained by polymerizing a by-product tar which is produced as by-product in manufacturing resorcinol or resorcinol and hydroquinone via hydroperoxide of m-diisopropylbenzene or of a combination of m- and p-diisopropylbenzenes (hereinafter referred to as m,p-diisopropylbenzene) and which contains m-substituted phenolic constituents or a combination of m- and p-substituted phenolic constituents (hereinafter referred to as m,p-substituted phenolic constituents) as major constituents.

The tar produced as by-product (hereinafter referred to as by-product tar) in manufacturing resorcinol or resorcinol and hydroquinone via hydroperoxide of m-diisopropylbenzene or of m,p-diisopropylbenzene contains m-substituted phenolic constituents or m,p-substituted phenolic constituents as major constituents. Among these constituents, m- or p-isopropenylphenol, -isopropylphenol, -hydroxyphenyldimethylcarbinol, -hydroxyacetophenone, -acetylphenyldimethylcarbinol, -diisopropenylbenzene, and dimers and higher oligomers of m- or p-isopropenylphenol have been identified.

Now, the by-product tar has heretofore been scarcely utilized effectively, being disposed of by burning or used at most as a supplement to fuel.

Under the circumstances, the present inventors conducted extensive studies on the effective utilization of the above-said by-product tar and, as a result, found that solid resinous products useful for coatings, adhesives, molding materials and the like are obtained by the polymerization of said by-product tar.

An object of this invention is to provide a solid resinous product obtained by polymerizing in the presence or absence of a polymerization initiator a by-product tar which is a by-product in manufacturing resorcinol or resorcinol and hydroquinone via hydroperoxide of m-diisopropylbenzene or m,p-diisopropylbenzene and which contains m-substituted phenolic constituents or m,p-substituted phenolic constituents as main constituents; a curable resin composition, cured product thereof, and a coating of tar-epoxy type all containing said resinous product; and to provide processes for the production of substances listed above.

As mentioned above, the by-product tar used in this invention is that produced as by-product in manufacturing resorcinol or resorcinol and hydroquinone via hydroperoxide of m-diisopropylbenzene or m,p-diisopropylbenzene and contains m-substituted phenolic constituents or m,p-substituted phenolic constituents as major constituents. Examples of the compositions are as shown in Table 1. The composition, however, varies according to the conditions under which resorcinol or resorcinol and hydroquinone are produced, and it is needless to say that other by-product tars than those having the compositions as exemplified in Table 1 can likewise be used.

A by-product tar stripped of a part or whole of the distillable components or that removed of high molecular weight components may also be used as an equivalent of the by-product tar as herein defined.

TABLE 1

| | By-product tar [I] (%) | By-product tar [II] (%) | By-product tar [III] (%) | By-product tar [IV] (%) | By-product tar [V] (%) | By-product tar [VI] (%) |
| --- | --- | --- | --- | --- | --- | --- |
| m-Isopropenylphenol | 5 | 17 | 23 | — | — | — |
| m,p-Isopropenylphenol | — | — | — | 2 | 7 | 12 |
| m-Isopropylphenol | 21 | 7 | 8 | — | — | — |
| m,p-Isopropylphenol | — | — | — | 20 | 6 | 7 |
| m-Hydroxyphenyldimethyl-carbinol | 10 | 8 | 10 | — | — | — |
| m,p-Hydroxyphenyldimethyl-carbinol | — | — | — | 11 | 9 | 11 |
| m-Hydroxyacetophenone | 1 | 3 | 2 | — | — | — |
| m,p-Hydroxyacetophenone | — | — | — | 1 | 3 | 2 |
| m-Acetylphenyldimethyl-carbinol | 3 | 5 | 6 | — | — | — |
| m,p-Acetylphenyldimethyl-carbinol | — | — | — | 3 | 5 | 5 |
| m-Diisopropenylbenzene | 6 | 4 | 4 | — | — | — |
| m,p-Diisopropenylbenzene | — | — | — | 5 | 4 | 4 |
| Dimer of m-isopropenyl-phenol | 23 | 27 | 15 | — | — | — |
| Dimer of m,p-isopropenyl-phenol | — | — | — | 25 | 32 | 19 |
| Others (resinous substance) | 31 | 29 | 32 | 33 | 34 | 40 |

In preparing the solid resinous product of this invention, polymerization of the by-product tar is carried out usually at 20° to 240° C. in the presence or absence of a solvent. Although the polymerization proceeds by heating only and a polymerization initiator is not always necessary, yet the use of an initiator is advantageous in accelerating the rate of polymerization.

The polymerization initiators suitable for the purpose are those generally used in cationic polymerization. Examples of such initiators include inorganic acids and salts such as hydrochloric acid, sulfuric acid, phosphoric acid, and potassium hydrogensulfate, solid acids such as silica-alumina, acid clay, and activated clay, organic acids such as formic acid, oxalic acid, mono-, di-, and tri-chloroacetic acid, benzenesulfonic acid, and p-toluenesulfonic acid, phosphorus halides such as phosphorus trichloride, phosphorus pentachloride and phosphorus oxychloride, and Friedel-Crafts' catalysts such as aluminium chloride, iron chloride, zinc chloride, and magnesium chloride.

The polymerization is carried out favorably at a temperature of 100° to 240° C. in the absence of any solvent.

A temperature above 240° C., at which temperature thermal decomposition of the formed polymerizate sets in, should be avoided.

In using the polymerization initiator, although not subject to any specific restriction, the amount generally adopted is 0.01 to 20% by weight based on the weight of the by-product tar.

The softening point of the solid resinous product obtained by the polymerization of such a by-product tar can be varied in accordance with the purpose of the intended use by controlling the amount of catalyst, temperature and other polymerization conditions, but is generally 50° to 120° C.

The polymerization can be carried out in the absence of solvents by selecting such a reaction temperature at which the reaction products remain in the liquid state or, alternatively, in the presence of non-polar solvents such as benzene, toluene, xylene and chlorobenzene.

When the polymerization is carried out under an atmosphere of inert gases such as nitrogen, there are obtained reaction products of improved color.

The solid resinous product obtained according to this invention is useful in a wide variety of uses. The adaptability of this resinous product to various uses is due to the reactivity originated in the hydroxyl group and other unsaturated groups of this product. A typical example of use is in the improvement of phenolic resins by the incorporation of this product. For instance, when this solid resinous product is incorporated in a novolak resin obtained by the reaction of a phenol with formaldehyde under an acidic condition and the resulting composition is cured with a formaldehyde-donor such as hexamethylenetetramine, the cured product is improved in heat resistance. Further, the solid resinous product can be used as the tar component of a tar-epoxy type coating material. The resulting coatings are excellent in physical properties and do not show bleeding contrary to those in which a conventional tar is used.

When used as the curing component in urethane resins and epoxy resins, the solid resinous product improves the heat resistance of coatings, molding materials and laminated sheets made from said resins. In addition to those applications which utilize the reactivity, the solid resinous product can be incorporated in hot melt adhesives and rubber-type adhesives to improve tackiness.

Thus, the solid resinous product of this invention will find uses in many fields such as coatings, molding materials, laminates, adhesives, binders for casting sand, and binders for abrasives.

The invention is illustrated below with reference to Examples, but the invention is not limited thereto.

EXAMPLE 1

Into a reactor provided with a thermometer, stirrer, dropping funnel and reflux condenser, was charged 600 parts by weight of by-product tar (III). To the reactor, while stirring at 110° to 120° C., was added dropwise 5 parts by weight of 10% hydrochloric acid over a period of 30 minutes to allow the reaction to proceed. The reaction mixture was then neutralized with 10% aqueous sodium hydroxide solution. The mixture was freed from water and low-boiling components by distillation to obtain 570 parts by weight of a brownish black resinous product having a softening point of 92° C.

EXAMPLE 2

Into a reactor provided with a thermometer, stirrer, and reflux condenser, were charged 500 parts by weight of by-product tar (I) and 10 parts by weight of acid clay. The mixture was allowed to react at 130° to 150° C. for 60 minutes and then concentrated at the same temperature under reduced pressure of 5 mmHg for 60 minutes to obtain a solid resinous product having a softening point of 92° C. Below is shown an example in which a phenolic resin molding material was modified with the solid resinous product obtained above.

(1) Composition of molding material

A composition shown in Table 2 was prepared.

TABLE 2

| No. | 1 | 2 |
|---|---|---|
| Solid resin obtained above | 20 | 0 |
| Phenol novolak | 80 | 100 |
| Silica | 250 | 250 |
| Calcium stearate | 3 | 3 |
| Hexamethylenetetramine | 15 | 15 |

(parts by weight)

(2) Preparation and molding of molding material

The molding material composition was milled on a twin-roll mill (90°–100° C.) for 5 minutes, then cooled and pulverized. The resulting molding material was compression molded at 160° C. and 180 kg/cm$^2$ for 2 minutes.

(3) Physical properties of molded material

TABLE 3

| No. | 1 | 2 |
|---|---|---|
| Heat distortion temperature (°C.) | 169 | 160 |
| Barcol hardness | 91 | 89 |
| Bending strength (kg/mm$^2$) | 16 | 14 |
| Boiling water absorption (%) | 0.04 | 0.06 |

EXAMPLE 3

Into a reactor provided with a thermometer, stirrer, dropping funnel, and reflux condenser, was charged 300 parts by weight of by-product tar (II). To the tar, while stirring and heating at 120° to 130° C., was added dropwise 6 parts by weight of 10% sulfuric acid. The mixture was maintained at said temperature for 60 minutes and then neutralized with 10% aqueous sodium hydroxide solution. The reaction mixture was stripped of water and low-boiling components to obtain a solid resin having a softening point of 85° C.

Thirty parts by weight of the above solid resin and 70 parts by weight of a commercial phenol novolak resin were mixed with 3,000 parts by weight of No. 7 silica sand which had been preheated at 150° C. After addition of 60 parts by weight of a 20% aqueous solution of hexamethylenetetramine, the mixture was further mixed together. When masses of the sand particles had become loose, 10 parts by weight of calcium stearate was added to the mixture. The resulting resincoated sand was examined for its performance as shell molding sand from the relationship between the time of heat treatment at 250° C. and the hot strength at 250° C.

By comparing with a shell molding sand prepared in a similar manner from a phenol novolak resin and hexamethylenetetramine, the sand coated with the solid resin of this invention was found to exhibit sufficient strength with a smaller amount of hexamethylenetetramine.

The experimental results were as shown below.

(I) Resin composition

TABLE 4

| No. | (Parts by weight) | | | |
|---|---|---|---|---|
| | 1 | 2 | 3 | 4 |
| Solid resin obtained above | 30 | — | — | — |
| Phenol novolak resin | 70 | 100 | 100 | 100 |
| Hexamethylenetetramine | 8 | 8 | 12 | 16 |

(II) Strength of bonded sand (hot bending strength, kg/cm$^2$)

TABLE 5

| | No. | 1 | 2 | 3 | 4 |
|---|---|---|---|---|---|
| Time of heat treatment (second) | 20 | 9 | 4 | 7 | 8 |
| | 40 | 18 | 10 | 15 | 17 |
| | 60 | 31 | 22 | 28 | 32 |

EXAMPLE 4

Into a reactor provided with a thermometer, stirrer, dropping funnel, and reflux condenser, was charged 600 parts by weight of by-product tar (IV). To the tar, while stirring and heating at 110° to 120° C., was added dropwise 5 parts by weight of 10% phosphoric acid over a period of 30 minutes to allow the reaction to proceed. The reaction mixture was neutralized with 10% aqueous calcium hydroxide solution. The reaction mixture was then freed from water and low-boiling components by distillation to obtain 570 parts by weight of a brownish black resinous product having a softening point of 90° C.

EXAMPLE 5

Example 4 was repeated, except that by-product tar (V) was used. There were obtained 570 parts by weight of a brownish black resinous product having a softening point of 90° C.

EXAMPLE 6

Example 4 was repeated, except that by-product tar (VI) was used. There were obtained 570 parts by weight of a brownish black resinous product having a softening point of 101° C.

EXAMPLE 7

In 34 parts by weight of xylene, was dissolved 100 parts by weight of the resinous product obtained in Example 4. The resulting solution was thoroughly mixed together with 134 parts by weight of "Sumi-Epoxy" ELA-172X-75 [a xylene solution (75% solids content) of a bisphenol-A type epoxy resin modified with dimer acid (polymerization product of fatty acids, commercially available as "Versadime 216" of Henkel); a product of Sumitomo Chemical Co.]. After addition of 25 parts by weight of "Sumicure" ML-2 (a curing agent of the modified aromatic polyamine type; a product of Sumitomo Chemical Co.), the mixture was thoroughly mixed together and applied by means of a brush to a piece of mild steel sheet polished with a sandpaper. After having been left standing at room temperature for one week, the coating layer was tested for physical properties. The results obtained were as shown in Table 6 (see No. 1).

EXAMPLE 8

In 68 parts by weight of xylene, were dissolved 100 parts by weight of the resinous product obtained in Example 5 and 100 parts by weight of the epoxy resin obtained in Referential Example (described later). After addition of 17 parts by weight of "Sumicure" P-740 (a polyamide-based curing agent of Sumitomo Chemical Co.), the mixture was thoroughly mixed together and coated by brushing on a piece of mild steel sheet polished with a sandpaper. After having been left standing at room temperature for one week, the coating layer was tested for physical properties. The results obtained were as shown in Table 6 (see No. 2).

EXAMPLE 9

A mixture of 500 parts by weight of the epoxy resin obtained in Referential Example (described later) and 100 parts by weight of dimer acid ("Versadime" 216 of Henkel Co.) was allowed to react in the presence of 0.3 part by weight of 2-ethyl-4-methylimidazole by heating at 120° C. for 3 hours to obtain dimer acid-modified epoxy resin having an epoxy equivalent of 700. In 68 parts by weight of xylene, were dissolved 100 parts by weight of the above epoxy resin and 100 parts by weight of the resinous product obtained in Example 6. After addition of 22 parts by weight of "Sumicure" ML-2 and thorough mixing, the mixture was coated by brushing on a piece of mild steel sheet polished with a sandpaper. After having been left standing for one week at room temperature, the coating layer was tested for physical properties. The results obtained were as shown in Table 6 (see No. 3).

EXAMPLE 10

In 50 parts by weight of xylene, were dissolved 100 parts by weight of the resinous product obtained in Example 2 and 100 parts by weight of "Sumi-Epoxy" ELA-134 (a bisphenol A-based epoxy resin having epoxy equivalent of 250 produced by Sumitomo Chemical Co.). After addition of 50 parts by weight of "Sumicure" P-740 and thorough mixing, the resulting mixture was coated by brushing on a piese of mild steel sheet polished with a sandpaper. After having been left for one week at room temperature, the coating layer was tested for physical properties. The results obtained were as shown in Table 6 (see No. 4).

COMPARATIVE EXAMPLE

By using "Sumi-Epoxy" ELA-134 and ELA-172X-75, tar-epoxy coatings of the composition shown in Table 6 were prepared. Each coating was applied by brushing to a piece of mild steel sheet polished with a sandpaper. After having been left standing at room temperature for one week, the coating layer was tested for physical properties. The results obtained were as shown in Table 6 (see Comparative Examples No. 1 and No. 2).

TABLE 6

| | Physical Properties of Coating Layer (50–80 μ in film thickness) | | | | | |
| | This invention | | | | Comparative Example | |
| No. | 1 | 2 | 3 | 4 | 1 | 2 |
|---|---|---|---|---|---|---|
| Resinous product of Example 4 | 100 | | | | | |
| Resinous product of Example 5 | | 100 | | | | |
| Resinous product of Example 6 | | | 100 | | | |
| Resinous product of Example 2 | | | | 100 | | |
| Tar[1] | | | | | 100 | 100 |
| Sumi-Epoxy ELA-172X-75 | 134 | | | | 134 | |
| Epoxy resin of Referential Example | | 100 | | | | |
| Epoxy resin of Example 9 | | | 100 | | | |
| Sumi-Epoxy ELA-134 | | | | 100 | | 100 |
| Xylene | 34 | 68 | 68 | 50 | 10 | 20 |
| Sumicure ML-2 | 25 | | 22 | | 25 | |
| Sumicure P-740 | | 17 | | 50 | | 50 |
| Pencil hardness | HB | 3H | H | HB | 5B | 5B |
| Bending resistance (mm) | 8 | 10 | 10 | 8 | 2 | 6 |
| Du Pont impact resistance (with backing; kg-cm) | 10–25 | 10–25 | 10–25 | 10–25 | 10–25 | 10–25 |
| Erichsen test (mm) | >8 | >8 | >8 | >8 | >8 | >8 |
| Peel test (cross cut, adhesive tape) (number of pieces) | 100/100 | 100/100 | 100/100 | 100/100 | 100/100 | 100/100 |
| Salt resistance (5% NaCl) — Salt spray (cross cut, 10 days) | o | o | o | o | Δ | x |
| Salt resistance (5% NaCl) — Salt immersion (3 months) | ⊚ | ⊚ | ⊚ | ⊚ | o | x |
| Chemical resistance — 5% NaOH (10 days) | o | ⊚ | ⊚ | ⊚ | Δ | Δ |
| Chemical resistance — 5% HCl (1 day) | ⊚ | ⊚ | ⊚ | ⊚ | Δ | Δ |
| Chemical resistance — Kerosene (20 days) | ⊚ | ⊚ | ⊚ | ⊚ | Δ Bleed | Δ Bleed |

Note:
[1] BITU-RESIN UPX-100; product of Usagida Chemical Co.
Rating:
⊚ excellent;
o good;
Δ some blisters;
x many blisters

REFERENTIAL EXAMPLE

Into a reactor provided with a thermometer, stirrer, dropping funnel, and water recovery device, were charged 270 parts by weight of the solid resin (having a hydroxyl equivalent of 270) obtained in Example 3 and 462.5 parts by weight of epichlorohydrin. To the mixture, while being boiled and stirred, was added dropwise 87.5 parts by weight of 48% aqueous sodium hydroxide solution over a period of 2 hours while removing water from the reaction system. The reaction mixture was freed from sodium chloride by filtration and the filtrate was concentrated to obtain 325 parts by weight of a brown epoxy resin having a softening point of 53° C. and an epoxy equivalent of 37.7.

What is claimed is:

1. A solid resinous product obtained by polymerizing at a temperature of 20° to 240° C. in the presence or absence of a solvent and in the presence or absence of a polymerization initiator a material consisting essentially of a by-product tar which is produced as by-product in manufacturing resorcinol or resorcinol and hydroquinone via hydroperoxide of m-diisopropylbenzene or of a combination of m- and p-diisopropylbenzenes and which contains m-substituted phenolic constituents or a combination of m- and p-substituted phenolic constituents as major constituents.

2. A solid resinous product according to claim 1 wherein the polymerization is carried out at a temperature of 100° to 240° C. in the absence of a solvent.

3. A solid resinous product according to claim 1, wherein the product has a softening point of 50° to 120° C.

* * * * *